Aug. 21, 1956 G. SIPKIN 2,760,180
LONG RANGE EXPLOSIVE SONOBUOY
Filed Oct. 6, 1949 6 Sheets-Sheet 1

INVENTOR
GEORGE SIPKIN
BY
ATTORNEY

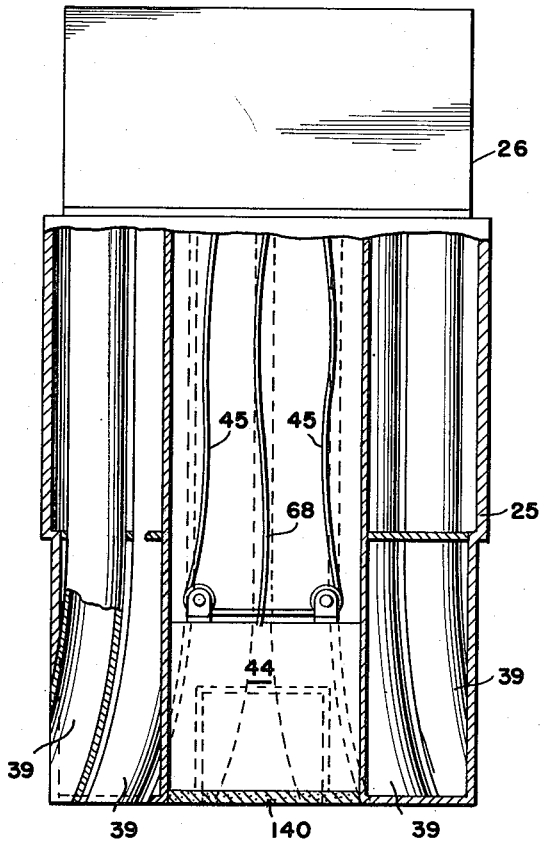
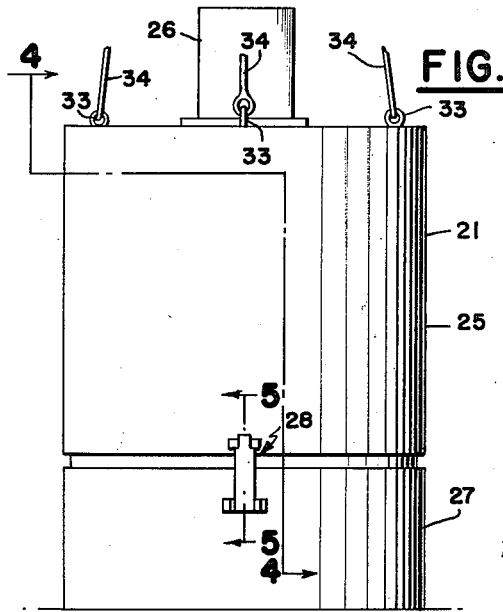
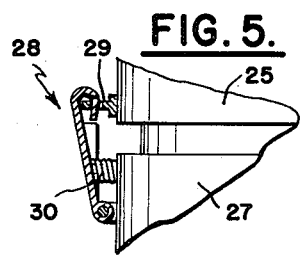

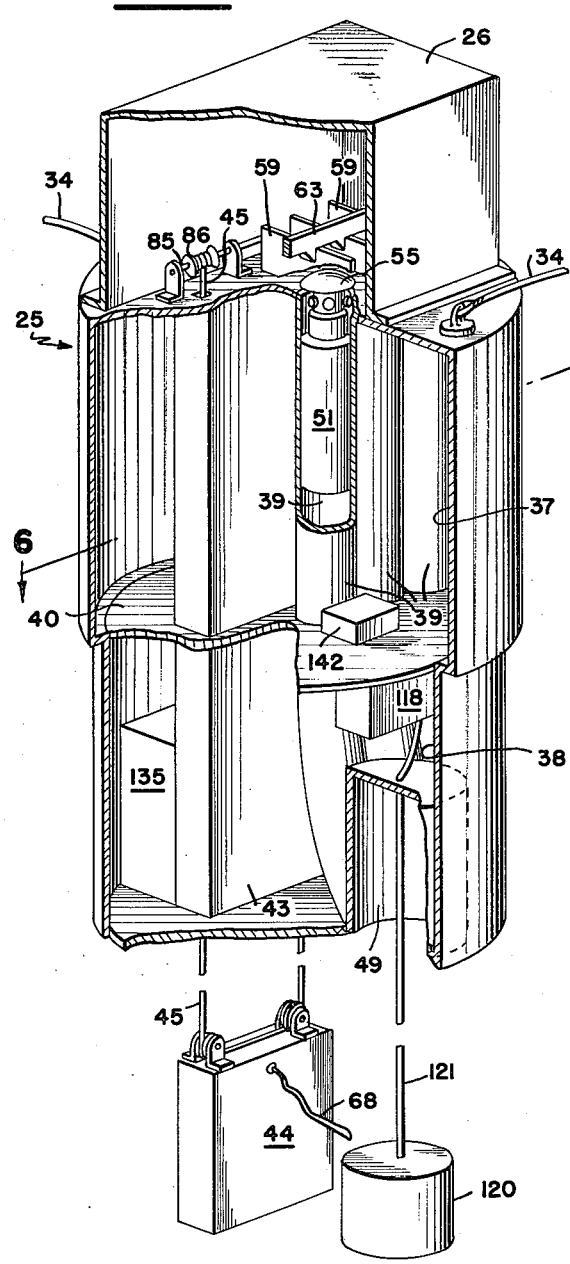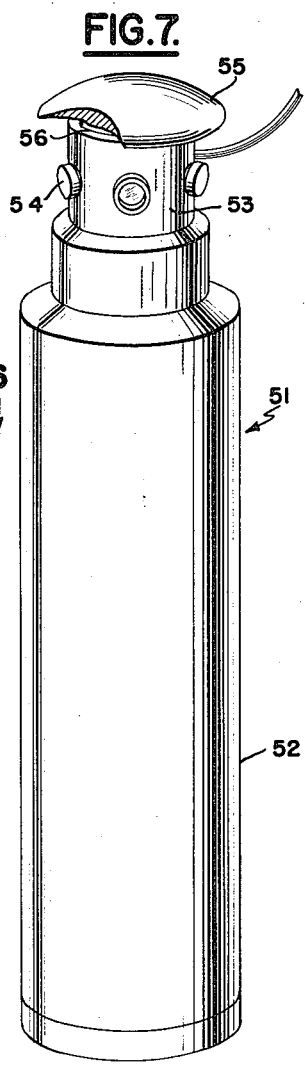

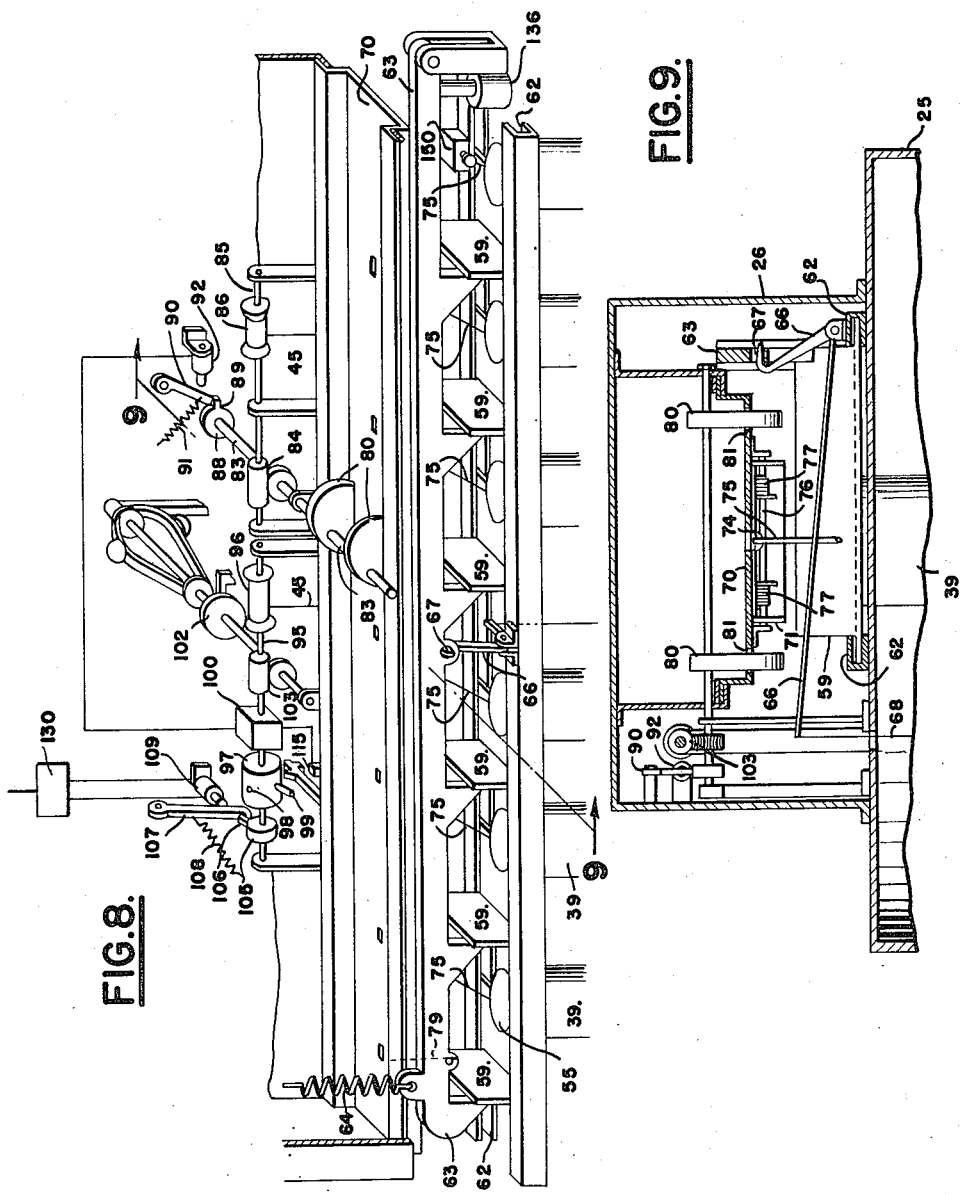

Aug. 21, 1956

G. SIPKIN 2,760,180

LONG RANGE EXPLOSIVE SONOBUOY

Filed Oct. 6, 1949

INVENTOR

GEORGE SIPKIN

BY

ATTORNEY

Aug. 21, 1956  G. SIPKIN  2,760,180
LONG RANGE EXPLOSIVE SONOBUOY
Filed Oct. 6, 1949  6 Sheets-Sheet 6

INVENTOR
GEORGE SIPKIN

BY *A. H. Helmstin*
ATTORNEY

United States Patent Office 2,760,180
Patented Aug. 21, 1956

2,760,180

LONG RANGE EXPLOSIVE SONOBUOY

George Sipkin, Washington, D. C.

Application October 6, 1949, Serial No. 119,986

6 Claims. (Cl. 340—6)

(Granted under Title 35, U. S. Code (1952), sec. 266)

The present invention relates to a sound-responsive vessel detection buoy and more particularly to a buoy actuated by ship noises which is capable of transmitting information for distances of thousands of miles.

Sound-responsive detection buoys have been used in attacking enemy submarines known to be within a reasonably restricted area, and have proved valuable in such a use. In general, these buoys are dropped from airplanes and comprise a battery-powered radio transmitter which is modulated by a hydrophone to enable an operator in an attacking airplane to hear the ocean noises at the location of the buoy and to thus locate the submarine. However, the power output of the transmitter is extremely limited to prolong the battery life, and the net result is a device which has a range of a few miles and a life of four to six hours before becoming inoperative by reason of battery exhaustion.

In order to produce a powerful signal capable of being heard for many miles and a long battery life in an instrument for detecting enemy vessels, it has appeared desirable to eliminate the radio transmitter and employ explosives to create sound waves in the water which would be carried by the water, somewhat similar in construction to an acoustical mine, and to employ several spaced hydrophones to determine the direction of the explosion. While such a system appears at first glance to offer an easy solution to a complex problem, more careful consideration of the problem develops many reasons why such a system would be inoperative at long ranges.

As is the case with all unconfined wave energy, neglecting absorption, the sound intensity varies inversely as the square of the distance traversed, so that the intensity of the sound signal arriving at a hydrophone one hundred miles from the explosion would have a value of one-ten-thousandth that of the same sound at a range of only one mile. Thus the explosion must be large to produce detectable signals at ranges of one hundred miles or more, and it must also be remembered that the actual attenuation is considerably greater than this theoretical attenuation because the water absorbs energy from the sound waves in transmitting them. In addition, many agencies in the ocean, both man-made and natural, produce high sound intensities in the water which may easily occur within a few hundred yards of the receiving hydrophone. Gun fire, torpedoes and other mines all produce underwater noise of the same characteristics as the desired sound signal, and ships operating in the ocen, especially damaged ships, produce very high intensity noises which cover a range from sub-audible to supersonic frequencies. Since these noises may be created at close ranges, and therefore not greatly attenuated by the water, they may be many times more powerful than a sound signal at a range of only a few miles from the receiving hydrophone.

In addition to these and many other man-made noises, there are numerous varieties of marine life, notably croakers, porpoises, and shellfish, which produce noises, and wind and waves also create sound in the ocean. The frequency range covered by natural agencies is wide, and while the sounds are often carried only very short distances, there may be many "singing" fish within a few hundred feet of the hydrophone, so that the noise is many times greater than that of a signal explosion at long range. While the human ear or other detecting device may receive a desired signal through a background two or three times as loud, the combination of man-made and natural noises will usually be sufficient to completely mask any but the loudest signal, and it will be readily apparent that such signals cannot be carried over long ranges in an unconfined water channel. Because of the very high background of noise which will be found at any surface receiving station, the operation of the hydrophone will be very erratic and cannot be depended upon to detect a signal, and because of the wide frequency ranges of the background noises, filters associated with the hydrophones are of very little use in eliminating noise. Further, a directional hydrophone demands a constant watch to determine the direction of the sound. Thus, the explosion of an acoustical mine near the surface of the ocean must be heard, if at all, through an overpowering background, and must produce a very intense sound signal in order to be effective. Such a signal is impossible to create in the ocean by an explosion at mine depth because of the sound propagation characteristics of the ocean itself.

The propagation rate of sound in water varies directly with the pressure and temperature of the water, the pressure of course increasing with the depth. The temperature varies over a wide range near the surface and decreases rather rapidly to a temperature of near freezing several thousand feet below the surface. Near the surface of the ocean, the temperature of the water affects the propagation rate more than the pressure, so that the propagation rate becomes slower as the depth increases. Under these conditions, the lower edge of a sound wave moves slower than the upper edge so that the sound wave is progressively refracted towards the bottom of the ocean and does not move outward in a straight line.

At a depth of several thousand feet, the temperature becomes quite low and thereafter decreases very slowly, so that the increasing pressure with depth becomes predominant and increases the propagation rate. The sound waves initiated near the surface are thus re-refracted toward the surface. Since the ocean surface is rough, it diffuses any sound waves striking it, although some of the sound energy is reflected toward the bottom to be again refracted until the continually refracted sound energy is absorbed. Thus, an explosion at ordinary mine depths creates sound waves which are scattered and absorbed in a few miles.

However, at the ocean depth where the rate of change in temperature becomes slight, there is a layer of water having a minimum propagation rate with higher propagation rates above and below. Thus any sound wave crossing this layer at an acute angle will be refracted to again cross the layer and is thus channelized within the layer of minimum sound propagation rate, or as hereinafter called the oceanic sound channel. The sound refracting power of water is slight and only sound waves making angles of less than about fifteen degrees with the sound channel are "captured," so that negligible sound power from sources far removed from the sound channel arrive at a suitable angle to be "captured" by the channel. Sound waves making greater angles with the sound channel pass through and are lost in the manner previously described, the effect being very similar to that of the "Lucite" tube used to transmit light in special instruments. Since the sound waves captured by the sound channel are prevented from spreading in a vertical plane, the intensity of the waves at a remote point varies directly as the distance traversed rather than as the square of the distance leading to a greatly increased range. In addition to this increase in range, the great circle paths followed by the sound tend to converge at ranges of more than a quarter of the earth's circumference thereby to further increase the intensity. Thus, the sound channel performs two functions; it excludes transient surface sounds and it retains sounds created within the channel so that they cannot be dissipated by reflection from the surface thereby maintaining their intensity over long distances as is made clear hereinafter.

Sound waves created far above the sound channel must travel long distances before reaching the sound channel, and are therefore greatly attenuated by absorption and diffusion. In addition, the waves are continuously refracted and reach the sound channel at too steep an angle to be "captured," and thus pass through the channel. Thus very few sounds created above the sound channel are present therein and at only very low energy levels, and, since marine life appears to be sparse at great depths, the sound channel is relatively quiet and free of extraneous sounds except when noises or explosions are intentionally created at the proper depth.

The depth of the sound channel is affected by the temperature at the surface of the ocean and is deeper as the surface temperature increases. However, the ocean temperature remains essentially constant throughout the year because the thermal capacity of water is high, and the sound channel depth is reasonably constant at any given location, and has been determined for large areas of the North Atlantic and the Pacific Ocean. The depth of the sound channel is less near the poles than in the tropics, but the change is gradual, and sounds are automatically refracted to follow the correct level at whatever depth it occurs. Thus an approximate depth of explosion is sufficiently accurate for large areas of the ocean, and pressure-sensitive bombs having adjustable detonating fuses are available. The depth of the sound channel varies from about 1500 feet in the Arctic and Antarctic waters to about 5000 feet in tropical waters with an average depth in the Pacific Ocean of about 3500 feet and in the Atlantic of about 4200 feet.

In the present invention a sound responsive floating buoy is provided with a hydrophone, an amplifier, and an operating device for consecutively releasing a plurality of pressure-responsive bombs each adjusted to explode at a predetermined depth, additional circuit means being also provided to prevent the dropping of a bomb in response to sporadic ocean noises and enemy counter measures. The buoy is adapted to be dropped into the water from an airplane in flight, after which it becomes active for a relatively long period of time. A plurality of receiving stations each equipped with a hydrophone located in the sound channel and an accurate time recorder are provided at a plurality of widely spaced points on the ocean to enable the position of the explosion to be located. Encoding means is included to provide a selectable cycle so as to identify the buoy and thus minimize enemy counter-measures, although, if desired, single bombs may be released after each actuation of the device.

It is an object of the present invention to provide a long range detection system employing the deep water sound channel for sound transmission.

It is a still further object of the present invention to provide a sound responsive buoy which produces an explosion in the deep water sound channel.

It is a further object of the present invention to provide a sound responsive buoy which does not require excessive battery drain and therefore possesses a long life.

It is a still further object to provide a sound responsive buoy whose presence is difficult to detect by the enemy.

Further objects and advantages of the present invention will be made more apparent in the following description and by reference to the appended drawings in which Fig. 1 is a graphic representation of the propagation characteristics of an ocean such as the Atlantic Ocean;

Fig. 2 is a view in elevation of the buoy of the present invention as it is dropped from an airplane;

Figure 3 is a view in elevation, and partly in section, of the buoy of the present invention in operation in the water;

Fig. 4 is an elevational view, partly in section, taken on line 4—4 of Fig. 2;

Fig. 5 is a detail view taken on line 5—5 of Fig. 2;

Fig. 7 is an elevational view of the bomb employed in the present invention;

Fig. 8 is a view in perspective of the bomb dropping mechanism used in the present invention;

Fig. 9 is a cross-section taken on line 9—9 of Fig. 8;

Figure 1:
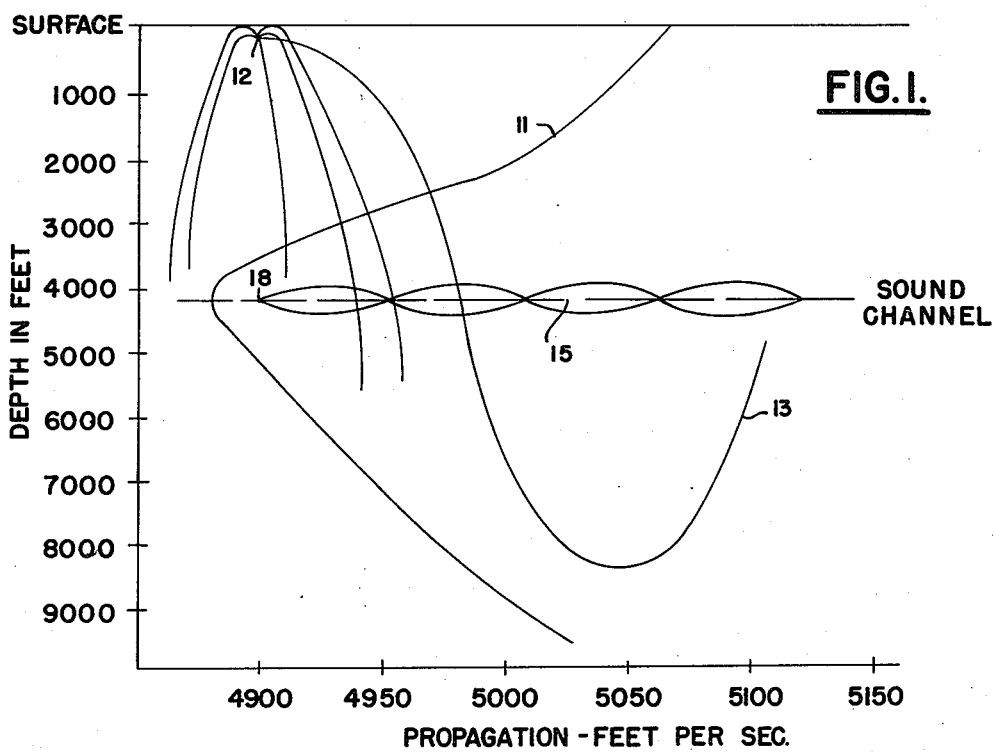

Referring now to the drawings, in which like reference numerals indicate like parts throughout the several views, Fig. 1 illustrates the propagation characteristics of the ocean, the curve 11 being a graphic representation of the propagation rate in the Atlantic Ocean. It will be observed that the propagation rate steadily decreases to a depth of about 4200 feet below the surface and then increases steadily at greater depths. An explosion at 12, representing a depth of about 100 feet, creates sound waves which travel in all directions from the explosion, and those waves striking the surface are reflected into the water again. It should be noted that the sound waves are refracted and reflected toward the bottom, and that few of these waves can arrive at the sound channel 15 at a sufficiently acute angle to be channelized. Sound waves originating near the surface and passing through sound channel 15 are refracted upward by the deep water as shown at 13. However, the water rapidly absorbs the sound energy transmitted by it, so that any sound energy arriving at the sound channel at a sufficiently acute angle will have been greatly attenuated by repeated refraction and reflection before arrival and will therefore be weak and ineffective.

However, an explosion at point 18 creates waves which are readily channelized at high intensities. Some of the energy of the explosion passes out of the sound channel and is lost, but a large part is captured and carried long distances. For example, an explosion of only 6 pounds of TNT has been detected over 3000 miles, and experimental tests indicate a range of 10,000 miles before the signal level and the background noise become equal.

Referring now to Fig. 2, the buoy 21 consists of a watertight body 25 capable of withstanding shock loading and equipped with an upper compartment 26 which is above the water line on the body 25. A bottom section 27 fits over the lower end of the body 25 to protect the buoy from injury on striking the water when dropped from an airplane, and is resiliently mounted with respect to the lower end of the buoy body. The bottom section 27 is secured to the buoy body 25 by means of a plurality of spring-loaded clips 28, best seen in Fig. 5, each of which are pivotally attached to the bottom section and engages a lug 29 attached to the body. A spring 30 tends to force the clip 28 off the lug 29 so as to release the bottom section, but the projection on the clip engages the lug maintaining the clip closed until the impact of the bottom section striking the water forces the body 25 and the bottom section 27 together sufficiently to allow the clip to separate. The bottom section 27 then fills with water and sinks away from the buoy.

A plurality of rings 33 are attached to the upper portion of the body 25 to which are attached a bridle 34 for a small parachute (not shown). An automatic release forming no part of the invention is inserted between the bridle and the parachute to release the parachute when the buoy is in the water. A satisfactory release mechanism may consist of a pair of springs biased clasps held closed by the weight of the buoy and prevented from releasing until the buoy has been dropped. Such devices are well-known to those skilled in the art, and need not be described further.

It is obvious that the parachute may be omitted and the buoy laid by hand from the deck of a vessel in which case a time release means may be provided to free the bottom section 27.

Referring now to Fig. 3, the body 25 is divided into a plurality of water-tight compartments which include the buoyancy chamber 37 and the instrument chamber 38. A plurality of vertical bomb tubes 39 pass through the body 25 and have a suitable diameter to receive tubular pressure-sensitive bombs 51, the lower ends of the tubes 39 being bent away from the center of the body to deflect the bombs from the devices suspended from the body 25. A vertical passage 43 parallel to the tubes 39 is provided to receive a weight 44 which is suspended when the buoy is in the water by means of the cable 45, the cable 45 being wound on drums in the bomb releasing mechanism as hereinafter explained.

A receptacle 49 is provided in the bottom of the body 25 to receive the omnidirectional hydrophone 120 and its suspension lead 121 which also functions as an electrical cable. The lead 121 is coiled up and the hydrophone 120 is maintained in the receptacle until launching by release of the bottom section 27, but when the buoy strikes the water and the bottom section falls away, the hydrophone also sinks until it hangs fully suspended from the lead 121.

The instrument compartment 38 is formed in the lower end of the body 25 by means of a baffle 40 sealed around the tubes 39 and the chamber 43 and to the outside walls of the body. Preferably, the bottom end of the buoy body 25 is made removable, at least in part, to allow access to the instrument compartment, and is provided for this purpose with substantially semicircular plates properly gasketed and held in position by clamping screws. Since this construction is old it is not deemed necessary to show and describe it in detail. The instrument compartment 38 carries the electronic control circuit hereinafter described and the power supply batteries 135.

The upper compartment 26 which is removably attached, is situated over the upper ends of the tubes 39 and the chamber 37, and contains the mechanism for dropping the several bombs in a desired fashion as hereinafter described.

Referring now to Fig. 7, the bomb 51 may be constructed with a cylindrical casing 52 and a detonating head 53, the detonating head containing a plurality of waterproof diaphragms of different areas so as to rupture at different pressures and an actuating diaphragm retained in position by a small shear pin. When a selected diaphragm ruptures, the water builds up sufficient pressure in the detonating head 53 to shear the pin and explode to bomb. The diaphragms are covered by caps 54 of the type used to seal soft drink bottles, and the depth at which the bomb explodes is determined by removing the correct one of the caps at the time the buoy is prepared for launching. An enlarged cover plate 55 with a notch 56 thereunder is secured to the top of the bomb, and the exploding charge may consist of 4 to 6 pounds of TNT, although the exact construction of the bomb 51 may be varied considerably without departing from the scope of the invention. The casing 52 is constructed with heavy walls to prevent crushing under the enormous pressures at great depths. The bomb per se is not part of the present invention, use being made of existing underwater sound signal bombs now employed in what is known as "Sofar" signalling.

Referring to Fig. 8, the bombs 51 fit loosely into the tubes 39 with the cover plates 55 uppermost, and angle plates 59 sliding in grooves 62 engage under the cover plates in the notches 56 to hold the bombs securely in the tubes 39. Since the bombs have previously been set for the correct exploding depth, no further adjustment is needed and a bomb is released and exploded by sliding the angle plate 59 to release the cover plate 55. A safety arm 63 is pivotally mounted to clamp the angle plates 59 securely in place until the buoy is in the water, and is biased by the spring 64 to move clear of the angle plates 59 when the latch 66 is withdrawn from the opening 67 in the arm 63. The latch 66 is withdrawn by the initial drop of the weight 44 by means of the light cord 68 (see Fig. 11) which ruptures after tripping the latch 66.

Figure 10:
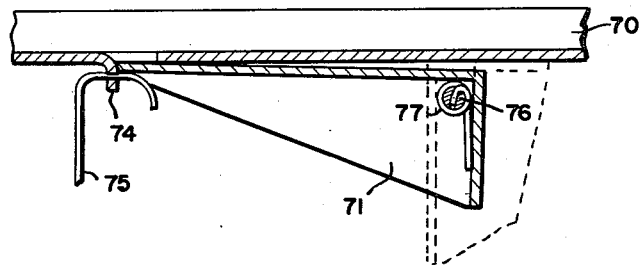
Fig. 10 illustrates a detail of the bomb dropping mechanism shown in Fig. 9.

Mounted horizontally above the cover plates 55 and the angle plates 59 is the sliding rack 70 which carries a plurality of hinged pawls 71. The pawls 71 are normally held folded against the rack 70 by means of arming wires 75 (see Fig. 10) passing through eyes 74 formed in the rack 70 and positioned close to the end of the pawls 71. The pawls 71 are biased to pivot about the shaft 76 to the dotted line position of Fig. 10 by the springs 77 when the arming wires are pulled from the eyes 74, and are sufficiently long to engage the angle plates 59 when in the dotted position. The pawls are so shaped as to prevent their rotation past a vertical position under the action of the springs 77.

Figure 11:
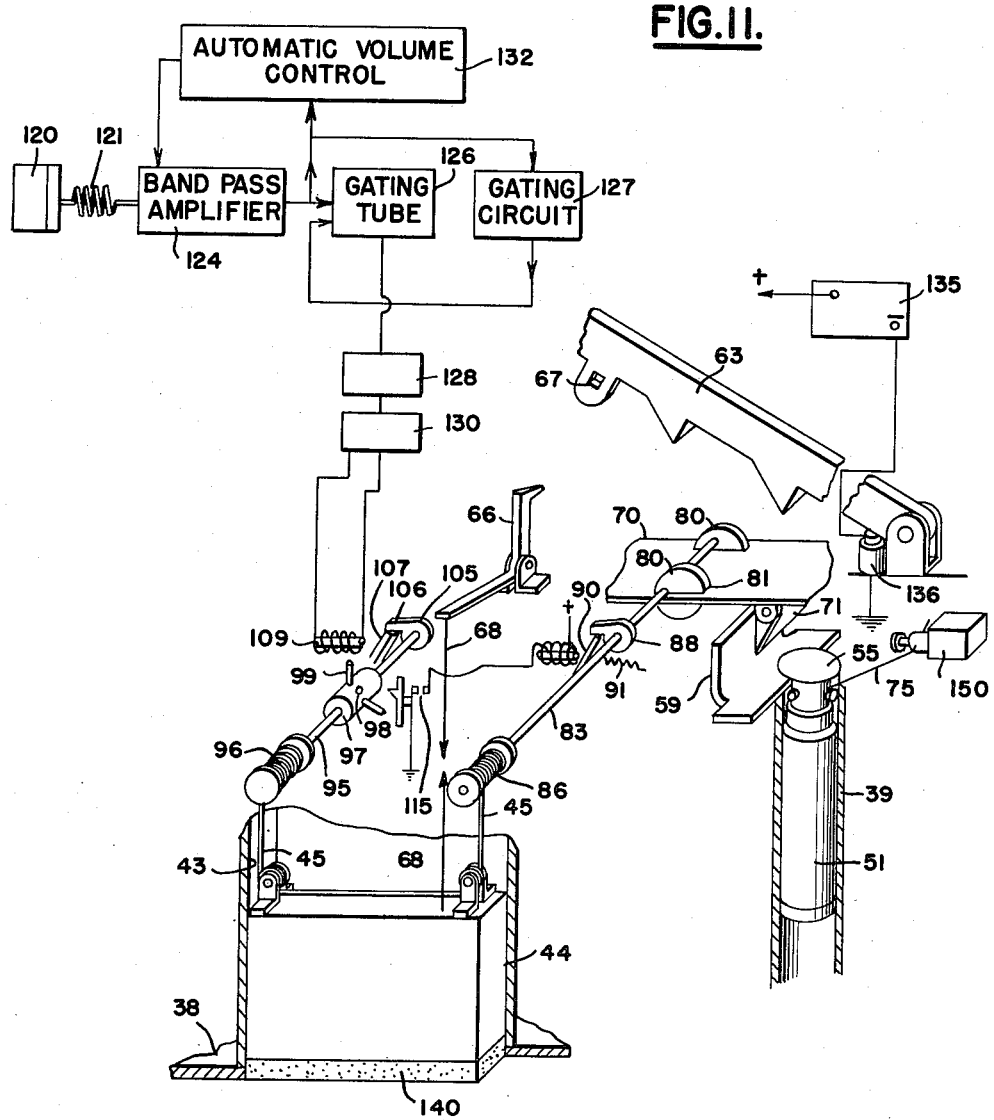
Fig. 11 is a block diagram of the electrical circuit employed in the present invention shown in schematic relation to parts of the device.

As shown in Figs. 9 and 11, the rack 70 is moved horizontally through a sufficient distance to remove the angle plates 59 from under the cover plates 55 by means of the eccentrics 80 fitting in the holes 81 in the rack 70. It will be apparent that each revolution of the eccentrics 80 will move the rack 70 through one cycle of operation which comprises first snapping a released pawl 71 into engagement with an angle plate 59 and then causing the pawl to move the plate 59 from under plate 55.

Each bomb 51 has an arming wire 75 attached to its upper end, and this arming wire is used to maintain the pawls 71 in a folded position. The arming wire attached to the first bomb to be dropped is used to fasten the pawl 71 associated with the second bomb, and so on through the series of bombs. The pawl 71 at the left end of the rack 70 as shown in Fig. 8 is associated with the first bomb to be dropped and is maintained in a folded position by means of a wire 79 attached to the safety arm 63.

The wires 75 and 79 should be of stiff metal such as piano wire which is heat-treated to be stiff and possesses a high tensile strength. Such wire is smooth and slides out of the eyes 74 easily. The wire 75 attached to the last bomb operates the switch 150 for a purpose hereinafter explained.

The eccentrics 80 are fastened to the horizontal shaft 83 mounted above and at right angles to the rack 70, and turn with the shaft. The shaft 83 is driven by the horizontal shaft 85 through the gearing 84. The reel 86 is attached to the shaft 85 and one end of the cable 45 is attached to and wound on the reel 86 for a considerable number of turns. The diameter of the reel 86 and the ratio of the gearing 84 are proportioned to produce a speed of rotation of shaft 83 of about 30 revolutions a minute when the shaft is driven by the unwinding of cable 45 from the reel 86 caused by the weight 40. Sufficient power is required to slide one angle plate 59 from under the cover plate 55 of a bomb, and sufficient turns must be placed on the drum 86 to release all the bombs in sequence.

A cam 88 having a projection 89 is attached to the shaft 83, and the projection 89 cooperates with the stop member 90 to normally prevent rotation of the shaft 83. The projection 89 is angularly disposed on the shaft 83 to normally position the shaft near the extreme right end of its cycle as shown in Fig. 8. The stop member 90 is biased into contact with the cam 88 by means of the spring 91 and is withdrawn from engagement with the projection 89 by means of the electromagnet 92.

A shaft 95 is positioned in a convenient location inside the upper compartment 26 and operates an encoding mechanism or timer. A reel 96 is attached to the shaft 95 and the other end of the cable 45 is attached to and wrapped around the reel 96 to supply power thereto from the weight 40. The speed of the shaft 95 is maintained reasonably constant at a low speed by means of a centrifugal brake governor 102 which is driven from the shaft 95 through step-down gears 103. When the speed of the shaft becomes excessive, the brake is automatically applied in a well known manner.

A drum 97 contains a plurality of angularly spaced holes 98 around its circumference each adapted to receive a peg 99, and is driven from the shaft 95 through a gearbox 100. The gear box 100 contains a high ratio step-down gear of the type used in electric clocks, and is arranged to operate the drum 97 at a very low speed, such as one revolution in fifteen minutes, although the ratio may be changed to increase the selection of encoding available as will be hereinafter explained. A normally open switch 115 is positioned near the drum 97 and is arranged to be closed momentarily by pegs 99 in the drum 97. When the switch 115 is closed, the stop member 90 is withdrawn from the projection 89 for a short time, which allows the eccentrics 80 to revolve one time to release one bomb which in turn releases the next succeeding pawl 71 into engagement with its cooperating plate 59. Thus the number of pegs 99 inserted in the drum 97 controls the number of cycles through which the eccentrics 80 operate in a single sequence, and the ratio of the gear box 100 and the angular disposition of the pegs 99 control the time interval between the release of consecutive bombs.

A cam 105 is attached to the drum 97 and has a projection 106 thereon cooperating with the stop member 107 to normally prevent rotation of the drum 97 and the shaft 95. A spring 108 biases the stop member 107 into contact with the cam 105 and an electromagnet 109 withdraws the stop member 107 when energized.

The noises emitted by a ship are a mixture of low frequency pressure waves, vibrations of widely varying frequencies, and propeller noises which also cover a wide range of frequencies and in many cases contain supersonic frequencies amplitude-modulated by lower frequencies. Since surface and underwater vessels are relatively slow, the sound continues for several seconds, while natural noises in the ocean as well as explosive noises do not persist for an appreciable period of time and have predominantly lower frequency components. It is therefore desirable to provide a detecting hydrophone system with a band-pass filter which passes high frequencies and excludes low frequencies and to employ a time-delay circuit to exclude noises of short duration. While some undesired natural and man-made noises will still be admitted, the ratio of desired to undesired noise is increased. An automatic volume control is also desirable to allow a sensitive circuit to be employed without overloading the tubes when a loud noise of the desired characteristics is received. Such a circuit is shown in patent application 517,201, filed January 6, 1944, by Nelson N. Estes for an Anti-Torpedo System. It will be readily seen that it is highly desirable to reduce the power requirements to a minimum by employing low-drain tubes and germanium crystal rectifiers wherever possible.

Referring now to Fig. 11, the hydrophone 120 is connected to a band-pass amplifier 124 which may be similar to the intermediate amplifier circuit of an ordinary superheterodyne radio receiver but having a frequency response in the range of ship's noises. The hydrophone 120 may be of any well-known type, such as the piezo-electric crystal type which may be connected directly to the input circuit of the amplifier 124 if desired. The amplified signal from the amplifier is applied to a gating tube 126 and to a time delay gating circuit 127. If the signals persist for a sufficiently long period of time, such as one second, at sufficient magnitude, the gating tube 126 is rendered operative to amplify and conduct the signal to the discriminator 128 which may consist of a short and a long time delay charging circuit connected in opposition to each other so that the short time delay charging circuit provides an accurate measure of the signal intensity while the long time delay charging circuit provides a voltage which is a measure of integrated intensity over a period of time. If the signal persists at a high level for an appreciable period of time, the long time delay charging circuit becomes charged to a relatively high voltage, which is of course less than the voltage on the short time delay circuit until the noise passes its peak value as when the vessel recedes from the vicinity of the hydrophone. When the noise has passed its peak value, the long time delay charging circuit is at a higher potential than the short time delay charging circuit and a signal is produced which fires the control circuit 130. The control circuit 130 is adapted to produce a powerful pulse of short duration which operates the electromagnet 109 and resets itself after a time delay of several seconds.

An automatic volume control circuit 132 responsive to the amplified signal from the amplifier 124 is provided to control the gain of the amplifier 124 in the well-known manner.

Circuits operative in the manner above described are found in application Serial No. 517,201 previously mentioned, although the invention is not limited thereto. It will be obvious to those skilled in the art that many other circuits are suitable for use in the present invention. If it should be desired to do so, magnetic responsive circuits may also be employed instead of acoustical systems, and since such circuits are also known to those skilled in the art, they are neither shown nor described herein.

The electric power circuit for the above-described electronic circuits and electromagnets employ the buoy body 25 as the return path, and a battery 135 secured in the instrument compartment 38 provides the power for their operation. The ground connection from the battery 135 to the body 25 is through a normally-closed switch 136 positioned near and held in an open position by the safety arm 63 until the buoy 20 is ready for operation in the water.

In order to prevent premature operation of the buoy 25, the weight 44 is wedged in the vertical channel 43 by means of a soluble salt crystal plug 140 which fits tightly in the channel and which is dissolved by the water after a time delay which is dependent upon the thickness of the plug. In the present application, the plug 140 may produce a delay of an hour to several hours depending upon the dormant period desired.

After the pressure-responsive bombs have been released, the utility of the buoy is ended and the floating buoy might be discovered and recovered by a hostile country. In order to insure that the buoy sinks, a small explosive charge 142 is mounted in the buoyancy chamber 37 to blow a hole therein. The charge 142 may be mounted against the tubes 39 and the baffle 46 and thus opens both the buoyancy chamber 37 and the instrument chamber 38 to the tubes 39. If desired an additional charge may be placed near the top of the buoyancy chamber 37 to provide an air vent to insure faster sinking. The explosive charge or charges 142 are arranged for electrical detonation from the battery 135 through the normally-closed spring loaded switch 150 located in the upper chamber 26 and maintained in an open condition by means of the arming wire 75 attached to the last bomb 51 in the buoy to be released.

The operation of the buoy is as follows:

The buoy is prepared for launching by inserting therein appropriately set bombs 51 and inserting a desired number of pegs 99 in selected holes in the drum 97 to produce a desired identification pattern, and the wires 75 and 79 are attached after which the upper compartment is sealed to the buoy body. The battery 135 is inserted and fastened in place in the instrument compartment 38, and the electronic equipment checked. After the equipment is in operating condition, the body 25 is sealed, the hydrophone cable coiled up and inserted with the hydrophone 120 into the receptacle 49. The salt crystal plug 140 is inserted and fastened below the weight 44, after which the bottom section is forced on the lower end of the body until the clips 28 can be engaged over the lugs 29. The parachute is appropriately secured to the bridle by means of the automatic release device previously described.

When the buoy is dropped from an airplane, the parachute reduces the impact with the water and insures that the buoy enters the water in the correct position. Upon striking the water, the automatic release device releases the parachute which sinks, and the impact releases the clips 28 and allows the bottom section 27 to fall away and sink. Because of the weight distribution, the buoy floats upright with the upper compartment 26 above the water, and the hydrophone 120 falls to the end of the hydrophone cable 121.

After a predetermined delay, the soluble plug 140 dissolves and allows the weight 44 to drop slightly thereby to trip the latch 66 by means of the cord 68 which then breaks. When the latch 66 is tripped, the safety arm 63 is pulled up by the spring 64 and closes the switch 136 to the battery 135 which starts operation of the electronic instruments. At the same time, the first pawl 71 is released into its projecting position by means of the wire 79. The buoy is thus prepared for operation and so remains until a vessel passes within hydrophone range of the buoy.

If a sound of the correct characteristics and duration reaches the hydrophone 120, the discriminator 128 actuates the control circuit 130 when the noise begins to subside and this in turn energizes the electromagnet 109 which operates the stop member 107. When the stop member 107 is withdrawn from the projection 106, the shaft 95 begins to revolve slowly under the influence of the reel 96 and the weight 44 thus driving the drum 97. As previously discussed, the drum 97 is fitted with one or more pegs 99 which have any selected spacing, and each peg 99 produces momentary closing of the switch 115 which operates the stop member 90 thereby permitting the eccentrics 80 to rotate rapidly through one revolution after which the eccentrics are stopped by the stop member 90 until another peg 99 actuates switch 115.

The eccentrics move the rack 70 slightly to the right to snap pawl 71 over plate 59 and then to the left to slide angle plate 59 from under the cover plate 55 of a bomb 51, allowing the bomb to fall by gravity, the arming wire 75 attached to the released bomb releasing the next succeeding pawl 71 into its projecting position. When the drum 97 has completed its revolution, it is stopped by the stop member 107 in its original position, and the control circuit 130 resets itself after a time delay. The period of operation of drum 97 is made sufficiently long so that the detected vessel has time to pass out of the zone of detection by hydrophone 120.

Additional ships passing will produce other cycles of operation similar to that described above. When the last bomb 40 is released, the wire 75 attached thereto allows the switch 150 to close and explode the charge 142 to sink the buoy.

A plurality of receiving stations are positioned at widely separated points on the earth's surface and are each equipped with hydrophones located at great depths corresponding to the depth of the sound channel. Where the water depth is sufficiently great near the shore, a hydrophone on the ocean bottom connected to shore station may be used, but in others, a stationary ship must be employed. The marine life at great depths is small and few noises are present in the sound channel, so that relatively simple receiving equipment is required. A simple filter tuned to the predominating signal frequency and followed by an amplifier and an accurate time recorder have been found sufficient to accurately locate the underwater explosion.

Since the propagation rate in the sound channel is relatively constant at about 4900 feet per second, the difference between the time of arrival at two stations will determine a position line on which the explosion is located, and by the use of three stations, three intersecting position lines definitely locating the explosion within a small area are obtained.

Figure 12:
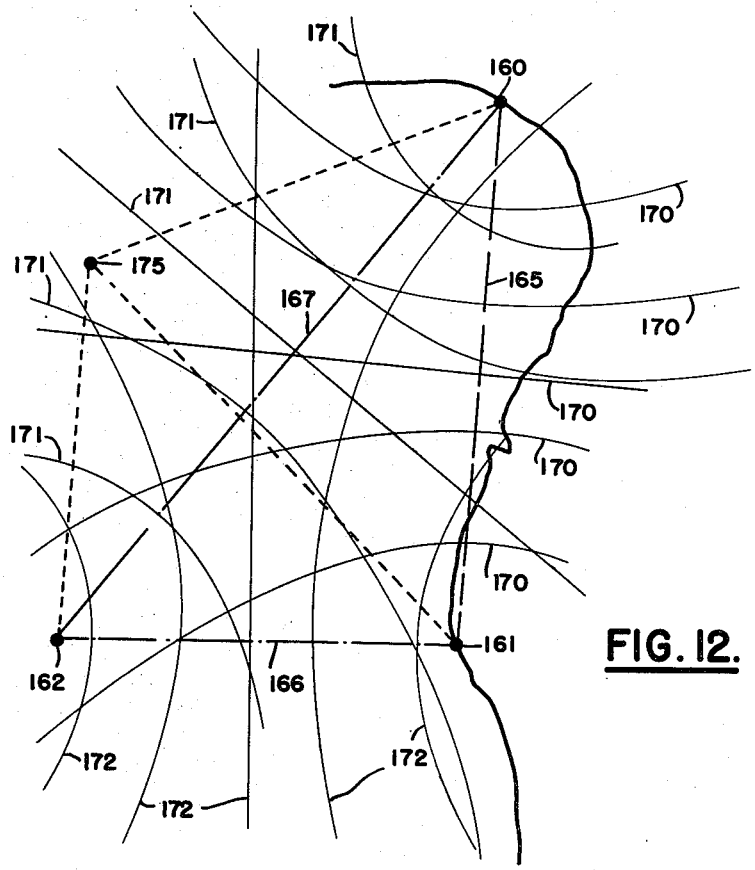
Fig. 12 is a chart used in locating the point of explosion of a bomb dropped by the buoy of the present invention.
Figure 6:
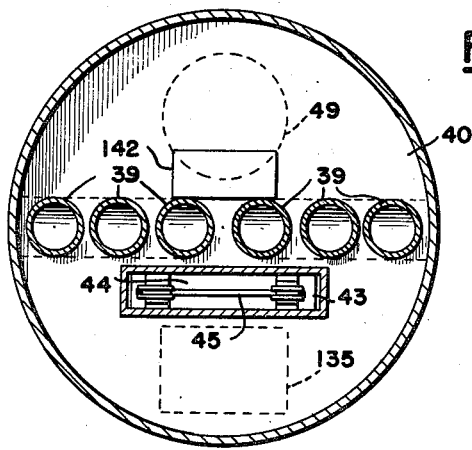
Fig. 6 is a cross-section of the buoy taken on line 6—6 in Fig. 3.

The charts employed in sound location by the time interval method have plotted thereon sets of hyperbolic curves extending in a perpendicular direction to a line between two stations, each curve representing a different time interval and sense in the time of arrival at the two stations. Since several stations are employed, several sets of curves are plotted on the chart. By knowing the times of arrival at at least three stations, the appropriate time intervals are computed by simple subtraction, and the operator is able to quickly locate the point desired on the chart and hence the longitude and latitude of the point. A chart such as would be employed is illustrated in simplified form in Fig. 12. Three stations 160, 161, and 162 are shown, thus establishing the base lines 165, 166, 167. If an explosion occurs at the point 175, the signal arrives first at station 162 and then at station 160 a short time later, the time interval being proportional to the difference between the distance from station 160 to point 175 and the distance from station 162 to point 175. Similarly, the signal noise arrives at station 161 later than at station 160, and the time intervals between stations 161 and 160, and between station 161 and station 162 each provide the data to determine an additional position line through the explosion point. Extreme accuracy in measuring the time of arrival is not required since in one second sound travels less than one (1) mile, whereas in radar and loran, radiant energy travels 186,000 miles per second.

The time interval between station 162 and station 160 would indicate that the sound source was nearer station 162 than station 160, and located on a position line determined by the difference in distance, and for plotting this position line, the operator employs the curves 171 and locates the correct interval on a curve 171 using station 162 as the zero point as the sound reached this station first. The time interval between stations 162 and 161 is plotted on curves 172 again using station 162 as the zero point, while the time interval between stations 160 and 161 is plotted on curves 170 in the same manner. The area in which the selected curves 170, 171, and 172 intersect contains the point in which the explosion originated.

By employing but a single pin 99 on the drum 97, a single bomb 51 may be dropped for each vessel which passes the buoy, the time of a complete revolution of the drum being selected so that the same vessel will not cause dropping of more than one bomb during a single passage by the buoy. It is possible that an enemy may become aware of the use of this device and attempt to drop similar bombs in areas where no vessels are present for the purpose of confusion. To counteract this practice, the pins 99 on the drum may be arranged to drop a plurality of bombs 51 in readily changed timed sequence so that a code of explosions received at the various stations will distinguish the desired signals from false signals.

It may also happen that the buoy will drift from the position in which it was originally laid and that the bombs 51 may then be improperly set for the depth of sound channel at the new location of the buoy. To obviate this, a plurality of pins 99 may be closely placed on drum 99 to drop a series of bombs closely spaced in time and previously set for varying depths so that at least one will explode in the sound channel.

It will be obvious to those skilled in the art that many modifications of the present invention may be made without departing from the spirit thereof. The types of hydrophones and the associated circuits may vary over a wide variety of devices. The type of operating circuit is a matter of design and may be readily varied.

The design of the bomb release mechanism may be changed. Instead of a plurality of tubes, a cylindrical magazine may be employed, and spring or electric motors may power the device instead of the weight and cable employed. The soluble salt plug may be omitted if desired, and a similar plug having a dissolving time slightly longer than the operative life of the battery may be inserted in the buoy to destroy the device if it remains unoperated or inoperative for more than its useful life.

The invention described herein may be manufactured and used by or for the Government of the United States of America for governmental purposes without the payment of any royalties thereon or therefor.

What is claimed is:

1. In a long range vessel detector, a buoy, a hydrophone for receiving noises created by vessels operating in the vicinity thereof, a plurality of pressure-responsive bombs adapted to explode near the depth of minimum sound propagation rate, and actuating means connected to said hydrophone for sequentially releasing a portion of said bombs in accordance with a predetermined time interval pattern, in response to vessel noises received by said hydrophone, whereby to transmit sound signals in the oceanic sound channel.

2. In a long range vessel detector, a buoy, a plurality of pressure-responsive explosive bombs adapted to explode near the depth having a minimum sound propagation rate releasably supported by said buoy, releasing means operatively connected with said plurality of bombs to sequentially release a portion of said bombs in accordance with a predetermined time interval pattern, in response to an operating signal, received from a hydrophone supported by said buoy for receiving sounds created by vessels operating in the vicinity of said hydrophone, and amplifier means connected to said hydrophone and said releasing means for amplifying said operating signal, and for applying an operating pulse to said releasing means in response to sound received by said hydrophone, whereby to transmit a sound signal in the oceanic sound channel.

3. In apparatus for producing a long range sound signal in response to vessel noises, a buoy, a plurality of pressure-responsive explosive bombs releasably carried by said buoy and adapted to explode near the depth of minimum sound propagation rate, a hydrophone and amplifying means connected with said hydrophone to produce an actuating pulse in response to noises from a vessel operating in the vicinity of said hydrophone, encoding means connected with said amplifier means to produce a selectable number of releasing pulses in a selectable timed sequence in response to an operating pulse from said amplifier, and bomb release means connected to said encoding means and adapted to release one of said pressure-responsive bombs in response to each releasing pulse applied thereto, whereby said sound buoy produces an identifiable long range signal in the oceanic sound channel.

4. In a vessel detecting buoy adapted to be dropped from an aircraft, a buoy, a plurality of pressure responsive bombs adapted to explode near the depth of minimum sound propagation rate releasably carried by said buoy, a hydrophone and amplifier means connected with said hydrophone to produce an operating pulse in response to vessel noises created in the vicinity of said hydrophone, a battery adapted to energize said amplifier, a switch for energizing said amplifier from said battery, and bomb releasing means connected with said amplifier to sequentially release a predetermined portion of said bombs in response to an operating pulse from said amplifier, safety means for maintaining said switch in an open position and securing said bombs to said buoy, and means for releasing said safety means when the buoy is in the water, thus enabling said buoy to transmit an identifiable long range sound signal in the oceanic sound channel.

5. In a vessel-detecting buoy adapted to be dropped from an airplane, a floating buoy, a hydrophone supported by said buoy adapted to receive sounds created by vessels operating in the vicinity thereof, an amplifier connected with said hydrophone to produce an operating pulse in response to said vessel noises, a battery adapted to energize said amplifier, a switch adapted to connect said battery to said amplifier, encoding means actuated by said amplifier to produce a selectable number of triggering indications in a selectable timed sequence, a plurality of bombs adapted to explode near the depth of minimum sound propagation rate releasably carried by said buoy, bomb releasing means responsive to each of said triggering indications to release one of said bombs, safety means for holding said switch in an open position and securing said bombs to said buoy to render said bomb release means inoperative, and means responsive to the presence of water for releasing said safety means to energize said amplifier and render said bomb release means operative, whereby said buoy is rendered capable of producing a long range sound signal.

6. In a vessel-detecting device of the type disclosed, a floating buoy, a hydrophone supported by said buoy and adapted to receive sounds created by a vessel operating in the vicinity thereof, an amplifier connected with said hydrophone to produce an operating pulse in response to said vessel's noises, a battery adapted to energize said amplifier, an encoding means, a switch adapted to connect said battery to encoding means actuated by said amplifier to produce a selectable number of triggering indications in a selectable timed sequence, a plurality of bombs adapted to explode near the depth of minimum sound propagation rate and releasably carried by said buoy, a releasable bomb-retaining member for each of said bombs, bomb-releasing means responsive to each of said triggering indications to release one of said bombs from its retaining member, said releasing means comprising a slidable rack member, a plurality of retracted pawl members pivotally attached to the undersurface of said rack member, each pawl member adapted to move a respective bomb-retaining member when in non-retracted position, safety means for holding said switch in an open position and for preventing sliding movement of said rack member; a plurality of removable, elongated retaining members, adapted to retain said pawls in retracted position, one of said retaining members having one end connected to said safety means and being adapted to release one of said pawls to operative position upon the release of said safety means; means responsive to the presence of water for releasing said safety means thereby closing said switch to energize said amplifier, free said rack member for sliding movement, and release one of said pawls to operative position, rotatable means adapted to slide said rack member, means for rotating said rotatable member, whereby said rack member is caused to slide, thereby causing said operative pawl member to contact a bomb retaining member and move said member out of bomb retaining position, thereby releasing said bomb; said bomb exploding at the oceanic channel, thereby rendering said vessel-detecting device capable of automatically transmitting a sound signal over extremely long distances.

References Cited in the file of this patent

UNITED STATES PATENTS

| | | |
|---|---|---|
| 1,491,004 | Duffie | Apr. 22, 1924 |
| 2,368,953 | Walsh | Feb. 6, 1945 |
| 2,379,447 | Lindsey | July 3, 1945 |
| 2,431,319 | Ellwood | Nov. 25, 1945 |
| 2,587,301 | Ewing | Feb. 26, 1952 |